United States Patent
Wilcox

[11] Patent Number: 6,164,676
[45] Date of Patent: Dec. 26, 2000

[54] VARIABLE REDUCTION CROSS-LINKAGE FOR REAR SUSPENSION BICYCLE

[75] Inventor: Weston M. Wilcox, Sun Prairie, Wis.

[73] Assignee: Trek Bicycle Corporation, Waterloo, Wis.

[21] Appl. No.: 09/246,168

[22] Filed: Feb. 8, 1999

Related U.S. Application Data

[60] Provisional application No. 60/075,442, Feb. 20, 1998.

[51] Int. Cl.$^7$ .................................................. B62K 25/30
[52] U.S. Cl. ............................................................ 280/284
[58] Field of Search ...................... 280/284, 283, 280/275; 180/227

[56] References Cited

U.S. PATENT DOCUMENTS

| | | | |
|---|---|---|---|
| D. 364,365 | 11/1995 | Lin et al. ................. | D12/111 |
| D. 368,880 | 4/1996 | Harrington ............. | D12/117 |
| 739,237 | 9/1903 | Travis . | |
| 1,130,828 | 3/1915 | Kuehn . | |
| 1,412,012 | 4/1922 | Bruno . | |
| 2,132,317 | 10/1938 | Pease ...................... | 280/284 |
| 2,283,671 | 5/1942 | Finlay et al. ............ | 280/284 |
| 2,446,731 | 8/1948 | Wheler .................... | 280/284 |
| 3,907,332 | 9/1975 | Richardson ............. | 280/285 |
| 3,942,821 | 3/1976 | Bock ....................... | 280/261 |
| 3,948,543 | 4/1976 | MacDonald et al. ... | 280/284 |
| 3,982,770 | 9/1976 | Satoh et al. ............ | 280/284 |
| 4,039,200 | 8/1977 | McGonegle .............. | 280/284 |
| 4,046,396 | 9/1977 | Taylor et al. ........... | 280/281 R |
| 4,058,181 | 11/1977 | Buell ....................... | 180/32 |
| 4,147,370 | 4/1979 | Lindsey, Jr. ............ | 280/234 |
| 4,170,369 | 10/1979 | Strutman ................. | 280/261 |
| 4,265,329 | 5/1981 | de Cortanze ........... | 180/219 |
| 4,303,256 | 12/1981 | Mortensen .............. | 280/261 |
| 4,327,930 | 5/1982 | Tominaga et al. ...... | 280/284 |
| 4,356,877 | 11/1982 | Kamiya .................. | 180/227 |
| 4,421,337 | 12/1983 | Pratt ....................... | 280/277 |
| 4,433,850 | 2/1984 | Miyakoshi et al. ..... | 280/277 |
| 4,576,393 | 3/1986 | Moulton et al. ........ | 280/276 |
| 4,582,343 | 4/1986 | Waugh .................... | 280/284 |
| 4,679,811 | 7/1987 | Shuler .................... | 280/284 |
| 4,744,434 | 5/1988 | Miyakoshi et al. ..... | 180/227 |
| 4,789,174 | 12/1988 | Lawwill .................. | 280/284 |
| 4,792,150 | 12/1988 | Groendal et al. ....... | 280/275 |
| 4,856,801 | 8/1989 | Hollingsworth ........ | 280/284 |
| 4,997,197 | 3/1991 | Shultz ..................... | 280/275 |
| 5,000,470 | 3/1991 | Kamler et al. .......... | 280/275 |
| 5,014,808 | 5/1991 | Savard et al. ........... | 180/219 |
| 5,121,937 | 6/1992 | Lawwill .................. | 280/284 |
| 5,205,572 | 4/1993 | Buell et al. ............. | 280/284 |
| 5,211,415 | 5/1993 | Gasiorowski ........... | 280/281.1 |
| 5,217,241 | 6/1993 | Girvin .................... | 280/284 |
| 5,226,674 | 7/1993 | Buell et al. ............. | 280/284 |

(List continued on next page.)

FOREIGN PATENT DOCUMENTS

| | | | |
|---|---|---|---|
| 497.017 | 2/1919 | France ................... | 280/284 |
| 923.235 | 7/1947 | France ................... | 280/284 |
| 2 395 879 | 7/1977 | France ................... | B62K 11/02 |
| 2395-879 | 3/1979 | France . | |
| 421518 | 3/1947 | Italy . | |
| 423515 | 7/1947 | Italy ....................... | 280/284 |
| 540821 | 3/1956 | Italy ....................... | 280/284 |
| 17336 | 10/1913 | United Kingdom ... | 280/284 |
| 24918 | 9/1918 | United Kingdom ... | 280/284 |
| 293941 | 7/1928 | United Kingdom ... | 280/284 |
| WO 89/09718 | 10/1989 | United Kingdom ... | B62K 25/00 |

*Primary Examiner*—Kevin Hurley
*Attorney, Agent, or Firm*—Boyle Fredrickson Ziolkowski S.C.; James F. Boyle

[57] ABSTRACT

A variable reduction cross-linkage for a rear suspension bicycle includes a four-bar linkage comprised of a portion of the frame between a first pivot point and a second pivot point, a portion of the rear swing arm, a long link and a short link. The swing arm is pivotable relative to the frame about the first pivot point. The long link is pivotable relative to the frame about the second pivot point. A shock absorber is pivotally attached to the frame and long link. The four-bar linkage operates so that upward pivotal movement of the swing arm results in a forward movement of the long link to thereby compress the shock absorber.

32 Claims, 5 Drawing Sheets

U.S. PATENT DOCUMENTS

| | | | |
|---|---|---|---|
| 5,244,224 | 9/1993 | Busby | 280/284 |
| 5,259,637 | 11/1993 | Busby | 280/284 |
| 5,269,552 | 12/1993 | Yelverton | 280/283 |
| 5,295,702 | 3/1994 | Buell | 280/284 |
| 5,306,036 | 4/1994 | Busby | 280/284 |
| 5,308,030 | 5/1994 | Bales | 248/214 |
| 5,316,327 | 5/1994 | Bell | 280/260 |
| 5,332,246 | 7/1994 | Buell | 280/284 |
| 5,335,929 | 8/1994 | Takagaki et al. | 280/283 |
| 5,356,165 | 10/1994 | Kulhawik et al. | 280/275 |
| 5,405,159 | 4/1995 | Klein et al. | 280/283 |
| 5,409,248 | 4/1995 | Williams | 280/284 |
| 5,409,249 | 4/1995 | Busby | 280/284 |
| 5,415,423 | 5/1995 | Allsop et al. | 280/281.1 |
| 5,435,584 | 7/1995 | Buell | 280/284 |
| 5,441,292 | 8/1995 | Busby | 280/284 |
| 5,452,910 | 9/1995 | Harris | 280/284 |
| 5,460,396 | 10/1995 | Sutter et al. | 280/284 |
| 5,474,318 | 12/1995 | Castellano | 280/284 |
| 5,487,497 | 1/1996 | Kwiatkowski | 224/41 |
| 5,489,139 | 2/1996 | McFarland | 297/195.1 |
| 5,498,014 | 3/1996 | Kulhawik et al. | 280/284 |
| 5,509,679 | 4/1996 | Leitner | 280/283 |
| 5,553,881 | 9/1996 | Klassen et al. | 280/284 |
| 5,570,896 | 11/1996 | Collins | 280/284 |
| 5,611,557 | 3/1997 | Farris et al. | 280/275 |
| 5,628,524 | 5/1997 | Klassen et al. | 280/284 |
| 5,658,001 | 8/1997 | Blanchard | 280/276 |
| 5,678,837 | 10/1997 | Leitner | 280/284 |
| 5,685,553 | 11/1997 | Wilcox et al. | 280/283 |
| 5,704,626 | 1/1998 | Kesinger | 280/220 |
| 5,725,227 | 3/1998 | Mayer | 280/284 |
| 5,749,590 | 5/1998 | Roerig | 280/276 |
| 5,762,353 | 6/1998 | Miller | 280/284 |
| 5,762,354 | 6/1998 | Brummer | 280/284 |
| 5,772,048 | 6/1998 | Sopcisak | 211/20 |
| 5,772,227 | 6/1998 | Michail | 280/275 |
| 5,772,228 | 6/1998 | Owyang | 280/284 |
| 5,785,339 | 7/1998 | Mamiya et al. | 280/283 |
| 5,791,674 | 8/1998 | D'Aluisio et al. | 280/284 |
| 5,813,683 | 9/1998 | Kulhawik et al. | 280/275 |
| 5,826,899 | 10/1998 | Klein et al. | 280/284 |
| 5,833,255 | 11/1998 | Sarder et al. | 280/220 |
| 5,842,711 | 12/1998 | Legerot | 280/281.1 |
| 5,899,480 | 5/1999 | Leitner | 280/284 |
| 5,901,974 | 5/1999 | Busby et al. | 280/284 |
| 5,909,890 | 6/1999 | Sachs et al. | 280/284 |
| 5,911,428 | 6/1999 | Ueda et al. | 280/276 |
| 5,957,473 | 9/1999 | Lawwill | 280/284 |

VARIABLE REDUCTION CROSS-LINKAGE FOR REAR SUSPENSION BICYCLE

RELATED APPLICATIONS

The present application claims priority based on a provisional application, Ser. No. 60/075,442, filed by the same applicant under the same title on Feb. 20, 1998.

BACKGROUND OF THE INVENTION

1. Field of the Invention

The present invention relates to a rear suspension system for a bicycle. In particular, the invention relates to a variable reduction cross-linkage for a rear suspension bicycle, wherein the cross-linkage effectively extends the stroke length of the shock absorber, especially in comparison to connecting the shock absorber directly to the swing arm of the rear suspension, resulting in a smoother and plusher ride than is possible on known suspension systems.

2. Background of the Related Art

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearwardly to the seat tube. The head tube, sometimes referred to as the neck, is a short tubular structural member at the upper forward portion of the bicycle which supports the front steering fork, which has the front wheel on it, and the handlebar. The down tube usually extends downwardly and rearwardly from the head tube to the bottom bracket, the bottom bracket usually comprising a cylindrical support member for the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on. The chain stays normally extend rearwardly from the bottom bracket, and the seat stays normally extend downwardly and rearwardly from the top of the seat tube, the chain stays and seat stays being joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a back triangular portion of the frame. The foregoing description represents the construction of a conventional bicycle frame which of course does not possess a suspension having any shock absorbing characteristics.

The increased popularity in recent years of off-road cycling, particularly on mountains and cross-country, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on nonsuspension conventional bicycles.

Over the last several years the number of bicycles now equipped with suspension systems has dramatically increased. In fact, many bicycles are now fully suspended, meaning that the bicycle has both a front suspension and a rear suspension. Front suspensions were the first to become popular. Designed to remove the pounding to the bicycle front end, the front suspension is simpler to implement than a rear suspension and is a front suspension fork easy to retrofit onto an older model bicycle. On the other hand, a rear suspension will increase traction, assist in cornering and balance the ride. Riding a fully suspended mountain bike down a rough, rock strewn trail, or even level riding on city and country roads, provides a new degree of safety and comfort to the rider. It is in downhill riding and racing that a rear suspension is most beneficial, but even on ordinary city and country roads, a rear suspension allows the rider to look forward more safely to view traffic and road conditions without paying disproportionate attention to stones and potholes immediately below.

A number of pivoting "swing arm" suspensions have been developed for rear wheel suspensions on bicycles. In its simplest configuration, the chain stays, which on a conventional bicycle frame are rigidly mounted, are replaced by a pair of swing arms that are pivotally attached at their front ends to the main front triangular portion of the frame. The rear ends of the swing arms, which carry the rear wheel, move upward and downward in response to the rear wheel striking rocks, curbs and other obstructions. The range of movement of the swing arm usually is controlled by a shock absorber affixed between the swing arm and the main front frame.

An example of one highly successful full suspension bicycle is disclosed in the applicant's own U.S. Pat. No. 5,685,553, which relates to a rear suspension for a bicycle having a Y-shaped frame. Like many other fully suspended bicycles, the rear suspension system disclosed in the applicant's '553 patent is comprised of a main front frame, a rear swing arm (which in the '553 patent is described as a unified rear triangle), and a shock absorber which is attached directly to the frame and also directly to the rear swing arm. Because the shock absorber is attached directly to both the frame and the swing arm, the stroke length of the shock absorber is directly proportional to the movement of the swing arm.

Like all other fields of industry, the bicycle industry as a whole and bicycle racing in particular is extremely competitive, resulting in an evolution of many different designs for rear suspensions. Bicycle designers have tried to optimize the performance of the rear suspension system by, among other things, moving the pivot point of the swing arm. Such rear suspension designs can be generally categorized into one of three categories: the low pivot, the high pivot and the multiple pivot. For example, U.S. Pat. No. 5,217,241 (Girvin) discloses a low pivot rear suspension. Here, a single pivot is located relatively close to the line of the top of the run of the chain, slightly above the bottom bracket. In contrast, the high pivot rear suspension generally has the pivot position relatively high above the chain and front derailer. Multiple pivot rear suspensions commonly employ the use of one or more additional components which function nothing more than to redirect the force of the shock absorbers so that it may be placed in a novel location. Multiple pivot rear suspension systems are illustrated for example in U.S. Pat. Nos. 5,226,674 (Buell) and 5,244,224 (Busby).

In virtually all such designs, the shock absorber is connected either directly to the swing arm, or in the case of multiple pivot suspensions connected through the use of only a single link such as in Buell and Busby, so that the stroke length of the shock absorber is nonetheless directly proportional to the pivotal movement of the swing arm. While some minor alterations can be made to the shock absorber to modify its performance, such as using a stronger or lighter spring or by increasing or decreasing its fluid dampening capability, the limited stroke length of the shock absorber necessarily limits the overall performance of the suspension system.

Accordingly, an improved rear suspension system for a bicycle is desired.

SUMMARY OF THE INVENTION

A variable reduction cross-linkage for a rear suspension bicycle is disclosed. The present invention includes a novel means for connecting the shock absorber to the rear swing arm in a manner which causes the stroke length of the shock absorber to travel a disproportionately greater distance than if the shock absorber were connected directly to the swing arm of the rear suspension.

The rear suspension system disclosed herein includes a four-bar variable linkage for the shock absorber, the four-bar variable linkage being essentially comprised of a portion of the frame, a portion of the swing arm, a long link and a short link. The frame is essentially comprised of the main front triangular portion which includes the head tube for supporting the steering fork, front wheel and handlebars, a seat tube for supporting the seat, and a bottom bracket for supporting the pedal-driven chain drive mechanism. The swing arm extends rearwardly from a first pivot point on the frame, the first pivot point being located near the bottom bracket. The long link is pivotally connected to a second pivot point, the second pivot point also being on the frame. The long link extends from the second pivot point in a direction somewhat parallel to a forward portion of the swing arm. The swing arm and long link are pivotally connected to each other by the short link. The shock absorber is pivotally connected to both the main front frame and to an intermediate portion of the long link. The components of the four-bar variable linkage, namely, the portion of the frame between the first and second pivot points, the forward portion of the swing arm, the long link and the short link, operate cooperatively in a manner whereby upward pivotal movement of the swing arm causes a forward pivotal movement of the long link, which in turn causes a compression of the shock absorber.

In comparison to prior art suspension systems wherein the shock absorber is connected directly to the rear swing arm, the novel linkage assembly disclosed herein effectively increases the stroke length of the shock absorber. In other words, the motion of the four-bar linkage variable is such that, as the swing arm pivots upwardly in response to a road obstruction (e.g., a rock or a curb), the point at where the shock absorber is connected to the long link travels a greater distance than if the shock absorber were connected directly to the swing arm. As a result, the rear suspension disclosed herein is able to take advantage of a longer stroke length of the shock absorber than is possible in other rear suspension designs. This allows the rear suspension to be both more sensitive to small bumps while also being firmer over large bumps. The ride is smoother and plusher in comparison to prior art rear suspension bicycles, which increases performance by providing the rider with more rear wheel traction and overall comfort and control.

The primary object of the invention is therefore to provide a fully independent linkage which dramatically enhances the travel of the rear shock, thereby producing a progressive shock compression system. Other objects and advantages of the invention will become apparent from the following description which sets forth, by way of illustration and example, certain preferred embodiments of the present invention.

BRIEF DESCRIPTION OF THE DRAWINGS

The drawings, which constitute a part of the specification and illustrate an exemplary embodiment of the present invention, include the following.

DETAILED DESCRIPTION OF THE PREFERRED EMBODIMENT

The invention disclosed herein is directed in particular to a rear suspension bicycle 10 which includes a means for providing a smoother and plusher ride than is possible on previously known rear suspension systems. In this case, the means for providing the plusher ride comprises a variable reduction cross-linkage 11 which causes the stroke length of the shock absorber to travel a greater distance than if the shock absorber were connected directly to the swing arm of the rear suspension.

Figure 1:
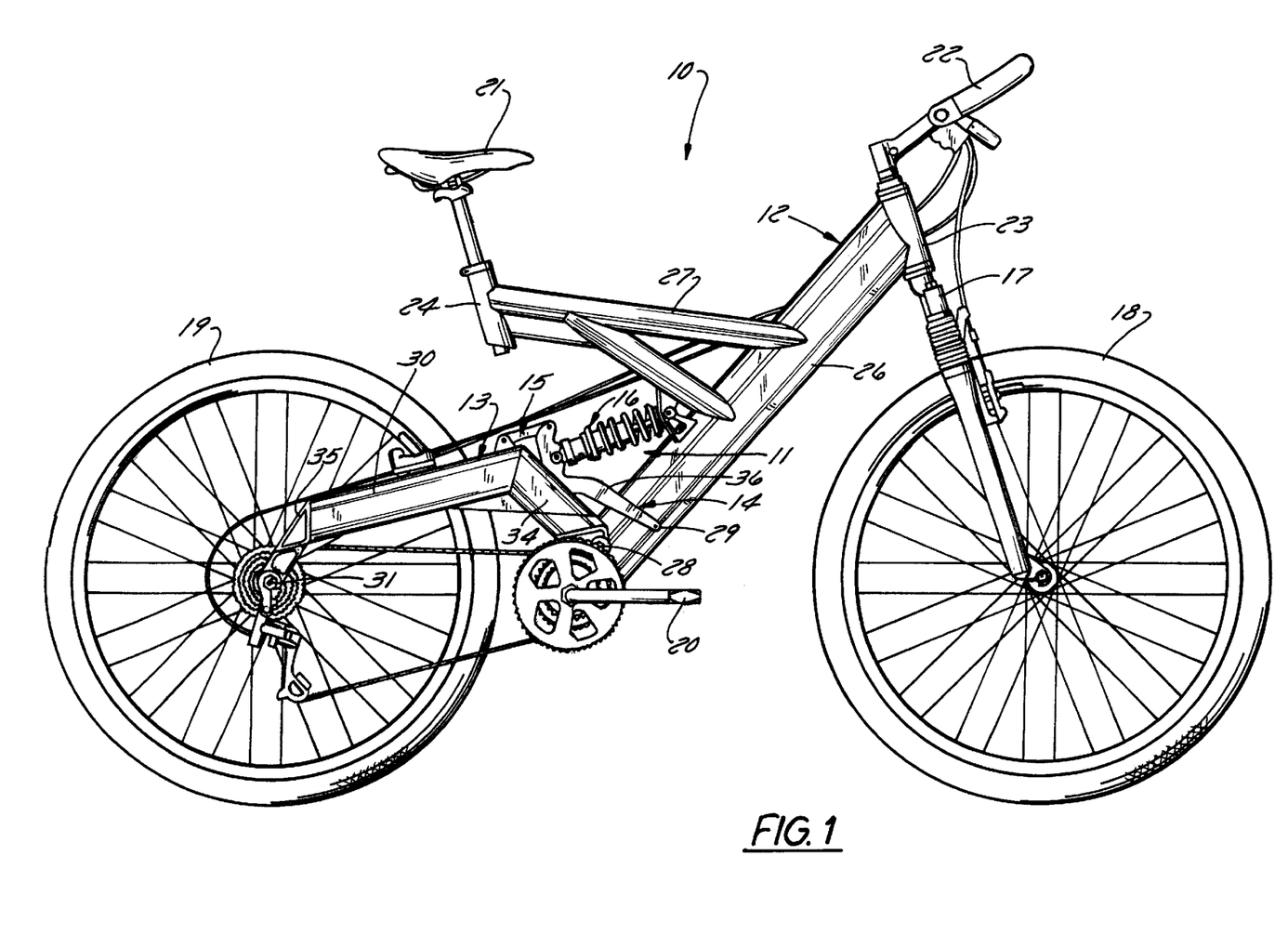
FIG. 1 is a side elevation view of a rear suspension bicycle which includes the variable reduction cross-linkage of the present invention.
Figure 4:
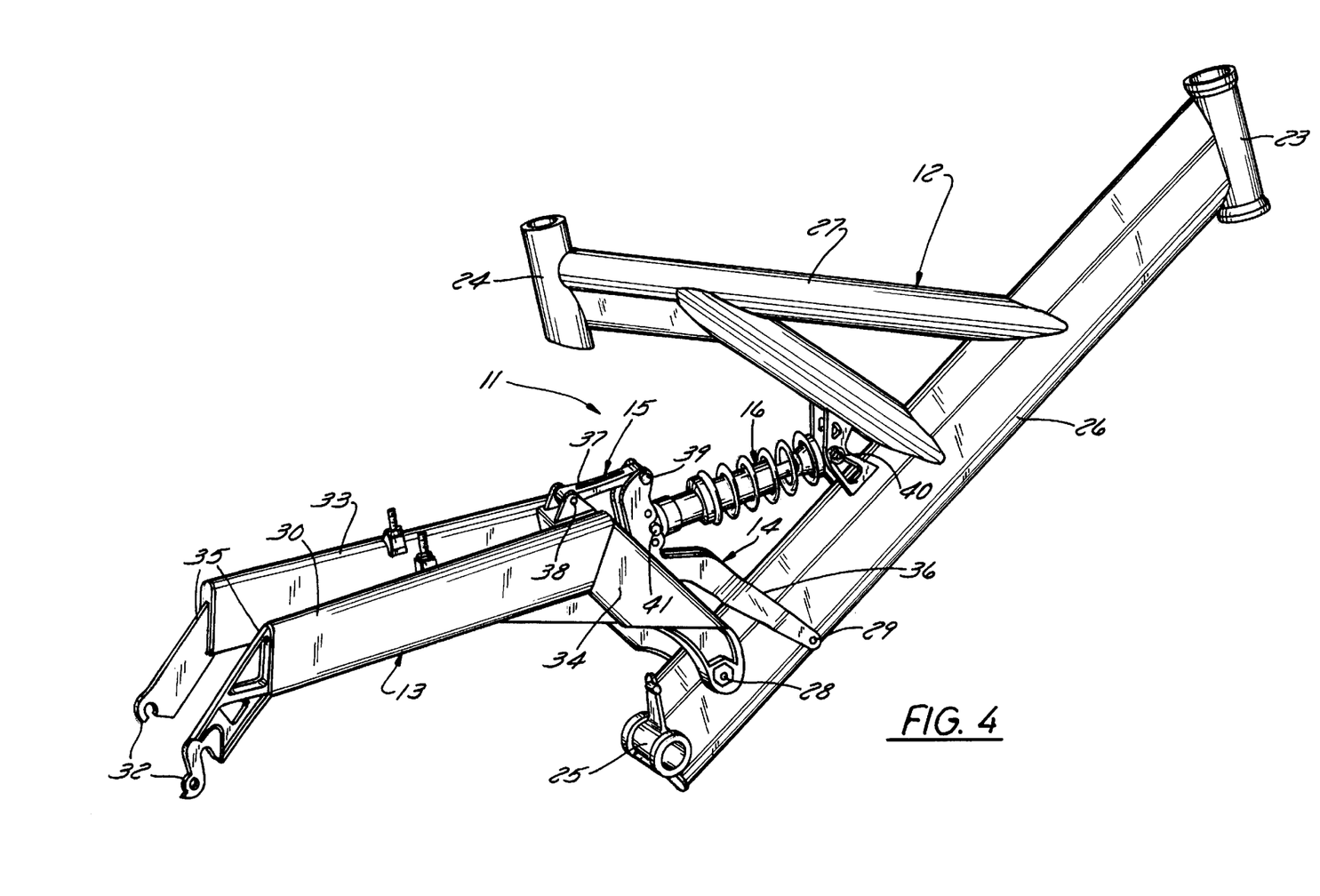
FIG. 4 is a perspective view of the rear suspension system.

Referring specifically to FIGS. 1 and 4, the primary components of the rear suspension system presented herein include a frame 12, swing arm 13, long link 14, short link 15, and shock absorber 16. Additional components for the bicycle 10, such as the front steering fork 17, front and rear wheels 18 and 19, pedals 20, seat 21, handlebar 22, and so forth, are commonly known and are similarly disclosed in, for example, applicant's U.S. Pat. No. 5,685,533.

The frame 12 is essentially comprised of what has been previously described as the main front triangular frame member. Specifically, the frame 12 in this instance includes a head tube 23 at the upper forward portion of the frame, a seat tube 24 at the upper rearward portion of the frame, and a bottom bracket 25 at the lower portion of the frame. The head tube 23 of course supports the steering fork 17, on which the front wheel 18 is attached, and supports the handlebar 22 for steering the bicycle. The seat tube 24 is used for adjustably supporting a seat 21, sometimes referred to as a saddle. The bottom bracket 25 supports the pedals 20 and chain drive mechanism for powering the bicycle.

The head tube 23, seat tube 24 and bottom bracket 25 are supported relative to each other by frame members which in this instance include at least a down tube 26 and a crossbar 27. The head tube 23 and bottom bracket 25 are rigidly supported to each other via the down tube 26 which extends from the head tube downwardly and rearwardly to the bottom bracket. The seat tube 24 is supported by the crossbar 27 which extends generally rearwardly from an upper portion of the down tube 26. The frame 12 is preferably comprised of a somewhat Y-shaped structural member having a vertical space between the seat tube 24 and the bottom bracket 25. The vertical space permits the assembly and free movement of various components of the rear suspension system discussed below.

The frame may be alternatively described in the terminology used to describe the Y-shaped frame disclosed in applicant's prior U.S. Pat. No. 5,685,553. In doing so, the frame in this case is thus comprised essentially of a head arm, a seat arm, and a down arm. The head arm extends forwardly and terminates at the head tube for supporting the steering fork and handlebars. The seat arm and down arm diverge rearwardly from the head arm and diverge from each other, with the seat arm extending rearwardly and terminating at the seat post, and the down arm extending downwardly and rearwardly and terminating at the bottom bracket. The seat arm and down arm converge at an intersection. The seat arm, head arm, and down arm form what is referred to herein as a generally Y-shaped frame.

The frame 12 further includes a first pivot point 28 for the swing arm and a second pivot point 29 for the long link (discussed further below). Preferably, the first pivot point 28 is located immediately forward and above the bottom bracket 25, and the second pivot point 29 is located slightly above and forward of the first pivot point 28.

The swing arm 30 is an elongated member pivotally connected to the frame 12 at the first pivot point 28. The swing arm 30 extends rearwardly from the first pivot point to the rear axle 31 and at that point includes a rear dropout 32 for supporting the rear wheel 19. Of course, there are actually two swing arm 30 and 33, one each on the right and left sides of the bicycle. Preferably, the swing arm 30 is an angled member having a forward portion 34 which extends from the first pivot point 28 on the frame 12 upwardly and rearwardly, and a rear portion 35 which extends from the top of the forward portion rearwardly to the rear axle 31. By configuring the swing arm in this manner the forward portion of the swing arm is aligned to operate cooperatively with the other members of the linkage (discussed further below) and there is space underneath the swing arm for the chain drive.

The long link 36, which may be referred to also as a first link, or alternatively referred to as a jaw bone link because of its looks, is pivotally connected to the second pivot point 29 on the frame 12. The long link 36 extends from the second pivot point 29 on the frame upwardly and rearwardly, and is preferably oriented somewhat parallel to the forward portion 34 of the swing arm 30. The upper portion of the forward portion of the swing arm and the upper portion of the first link are pivotally connected to each other by the short link 37. To be more specific, the short link, which may be referred to also as a second link, or alternatively referred to as a dogbone link because of its looks, is an elongated but relatively short member having a first end and a second end. The first end of the short link 37 is pivotally connected to a third pivot point 38 located on the upper portion of the forward portion of the swing arm 30. The second end of the short link is pivotally connected to a fourth pivot point 39 located on the upper end of the long link 36. Taken together, the lower portion of the frame between the first pivot point 28 and second pivot point 29, the forward portion 34 of the swing arm 30, the long link 36 and the short link 37 are all pivotally connected to each other to form what is referred to here as a four-bar variable linkage 11.

The shock absorber 16 is a component having a first end, second end, a spring, and a fluid dampening mechanism. The shock absorber 16 has a stroke length defined by the distance that the first end and second end of the shock absorber become compressed towards each other when the rear suspension system is under load (e.g., when the rear wheel hits a rock or other obstruction).

The first end of the shock absorber 16 is pivotally connected to the frame 12 and the second end of the shock absorber is pivotally connected to the long link 36. The shock absorber 16 is connected to the frame 12 at a point which is preferably located at or substantially near the intersection where the crossbar 27 supporting the seat tube is joined to the down tube 26. In the terms used in the applicant's prior '553 patent, this point may be alternatively described as the intersection of the seat arm and down arm of the Y-shaped frame. In any event, the shock absorber 16 is connected to the frame 12 of at a point which may be referred to as the fifth pivot point 40. The point at where the shock absorber 16 is connected to the long link 36 may be referred to as a sixth pivot point 41. Additionally, the shock absorber is preferably, though not necessarily, connected to the intermediate portion of the long link, and the shock absorber is oriented lengthwise (i.e., in a direction from the first end to the second end) in substantial alignment with a line extending from the fifth pivot point 40 on the frame to the rear axle 31. The shock absorber 16 and four-bar variable linkage 11 are thus located within the space between the seat tube 24 and bottom bracket 25.

Figure 2:
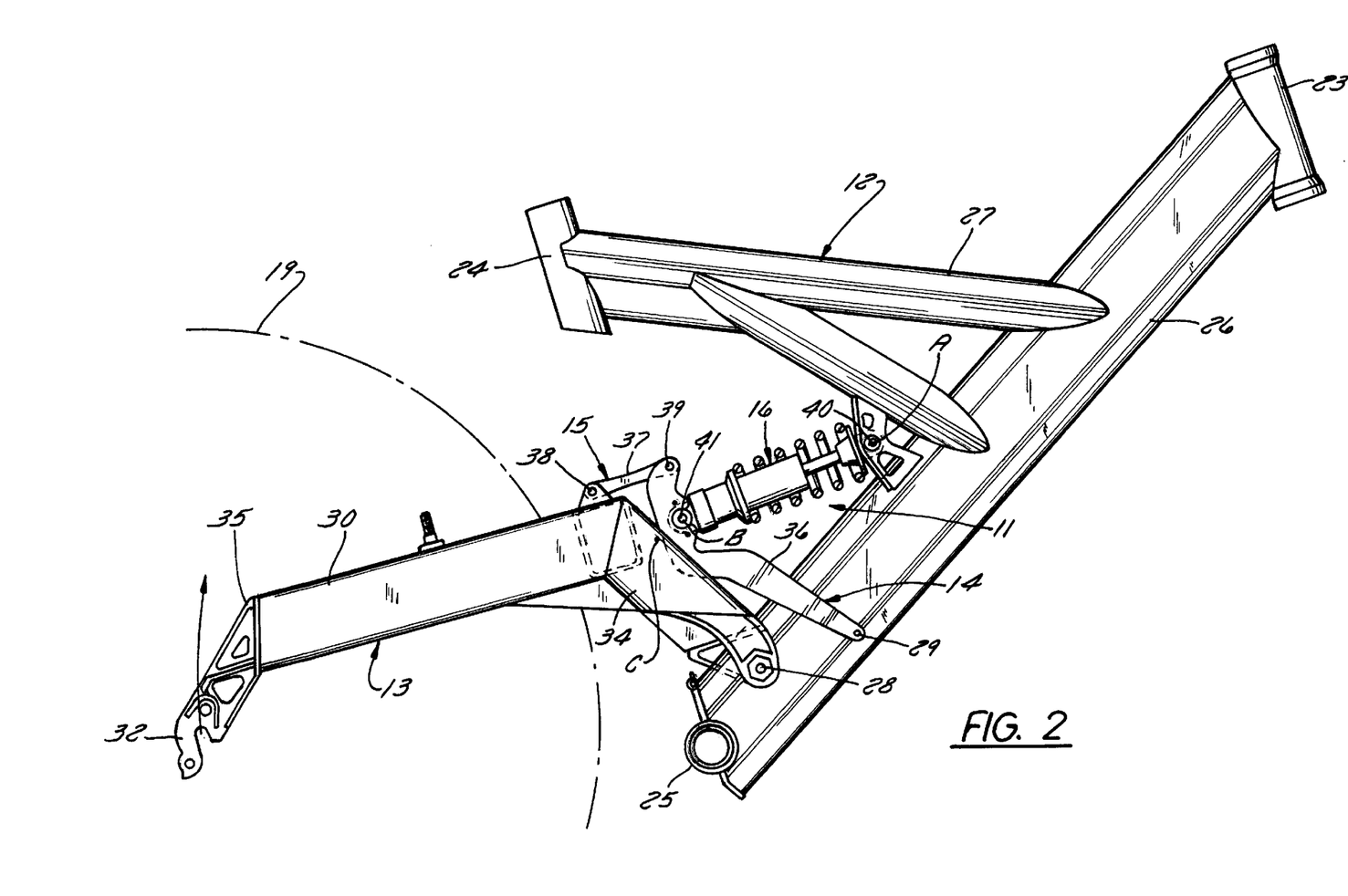
FIG. 2 is a side elevation view of the rear suspension system of the present invention shown in a substantially unloaded condition.
Figure 3:
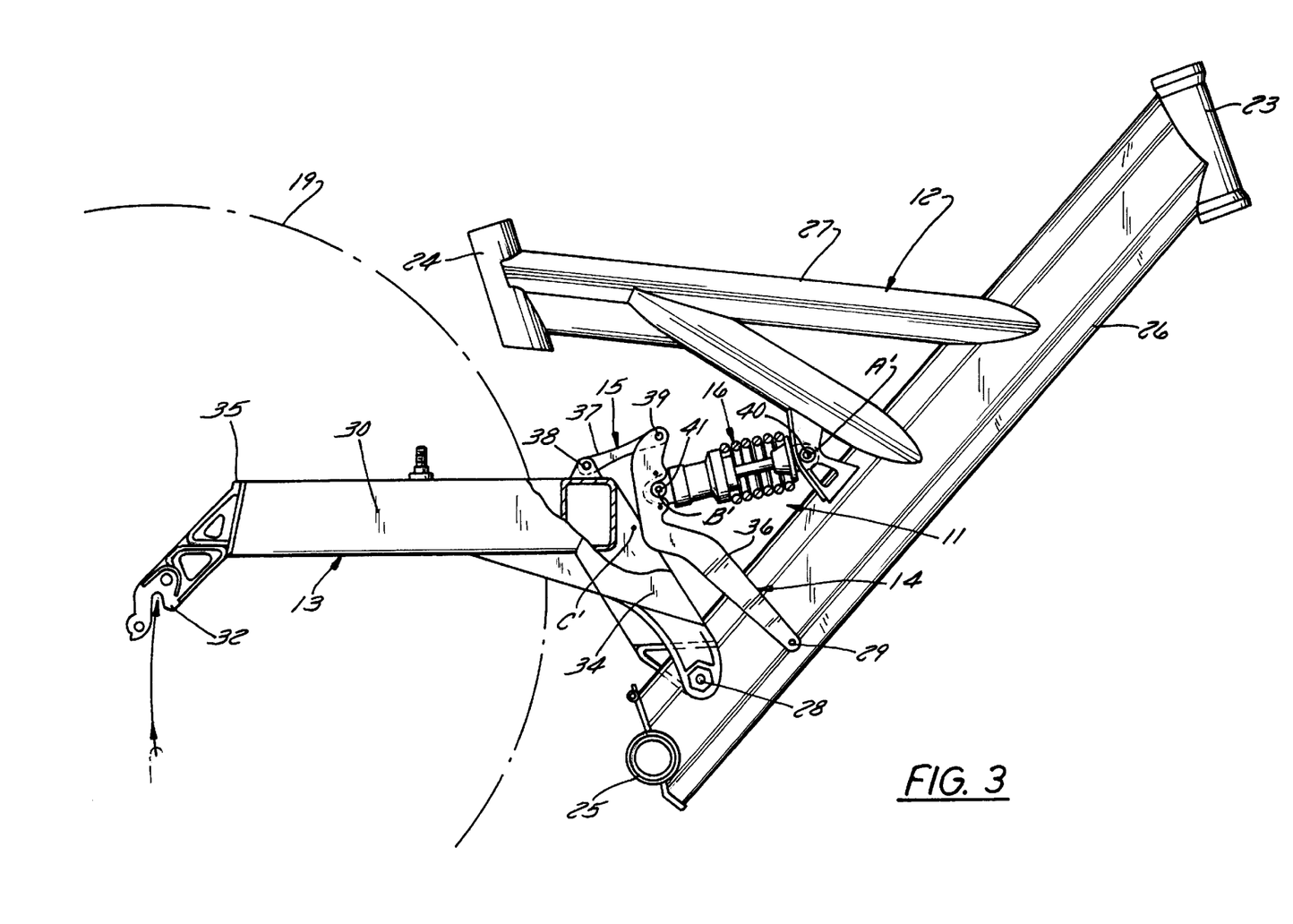
FIG. 3 is a side elevation view of the rear suspension system, partially in section, shown in the loaded condition.

The purpose of providing a rear suspension system is to permit the rear axle to move upward in the event the rear wheel strikes a rock or other obstruction, which is commonly encountered in off-road bicycle riding. FIG. 2 shows the suspension system in the unloaded condition. FIG. 3 shows the system in the loaded condition, e.g., when riding over a rock. As shown in FIG. 3, when the rear wheel hits an obstruction, the swing arm 30 rotates upwardly, which in turn causes the long link 36 to rotate forwardly and thereby compress the shock absorber 16.

The effect of a four-bar variable linkage on the stroke length of the shock absorber 16 can be seen by comparing the relative movement of the point where the second end of the shock absorber is connected to the long link 36 (i.e., the sixth pivot point 41) to the relative movement of a corresponding point on the swing arm 30 if the second end of the shock absorber 16 was instead connected directly to the swing arm 30. Referring to FIG. 2, the first end of the shock absorber is pivotally connected the frame at a point which for this analysis will be designated as point A (which is of course the same as the fifth pivot point 40). The second end of the shock absorber is pivotally connected to the intermediate portion of the long link at a point designated as B (which is of course the same as the sixth pivot point 41). The first end of the shock absorber (point A) and the second end of the shock absorber (point B) define an axis which, if extended slightly, would intersect the swing arm at a point designated as C. For purposes of this comparison, point C will be considered the point where the swing arm would normally be connected directly to the swing arm.

When the rear wheel hits an obstruction, the swing arm 30 rotates upwardly as shown in FIG. 3. In doing so, point C on the swing arm moves forwardly to point C'. However, the four-bar variable linkage now causes the long link 36 to rotate forwardly and upwardly, so that the point originally designated B also moves forwardly and upwardly to a point designated as B'. In comparing the relative movement of the two points, it can be seen that the distance from point B to B' is greater than the distance from point C to C'. To put it in terms of the stroke length of the shock absorber, the difference in the distance from point A to point B and points A to B' is greater than the difference in the distance from points A to C and points A to C'. The mathematical relationship is:

AB—AB'>AC—AC'

Consequently, relative to point A, which is where the shock absorber is attached to the frame, the four-bar variable linkage causes point B' to travel a greater distance than point C'. Stated differently, the stroke length of the shock absorber is greater by virtue of it being connected to the four-bar variable linkage at point B than if it had been connected directly to the swing arm at point C.

The effect of the four-bar variable linkage can be alternatively analyzed by looking at what is referred to in the bicycle industry as the "leverage ratio." The leverage ratio is determined by dividing the distance between the main pivot and the rear axle (D) by the distance between the main pivot and the point where the shock absorber is connected to the rear swing arm (d). For this analysis the sixth pivot point 41 (point B) will be considered the point where the shock absorber is "effectively" connected to the rear suspension. Thus, the distance between the first pivot point 28 and the rear axle 31 defines distance D, and the distance between the first pivot point 28 and the sixth pivot point 41 (point B) defines distance d. For all prior art systems where the shock absorber is indeed connected directly to the rear swing arm, the leverage ratio $$\left(\frac{D}{d}\right)$$

remains constant. However, in the present invention the leverage ratio $$\left(\frac{D}{d}\right)$$

varies as a function of rear axle travel. This is accomplished by having the shock absorber attached to the four-bar variable linkage rather than directly to the swing arm. As the rear axle moves up and over an obstruction, the effective distance (d) increases by means of the linkage. As distance (d) increases, the leverage ratio $$\left(\frac{D}{d}\right)$$

decreases. This effect allows the rear suspension to be both more sensitive to small bumps while also being firmer over large bumps. It increases performance by providing the rider with more rear wheel traction and overall comfort and control.

Figure 5:
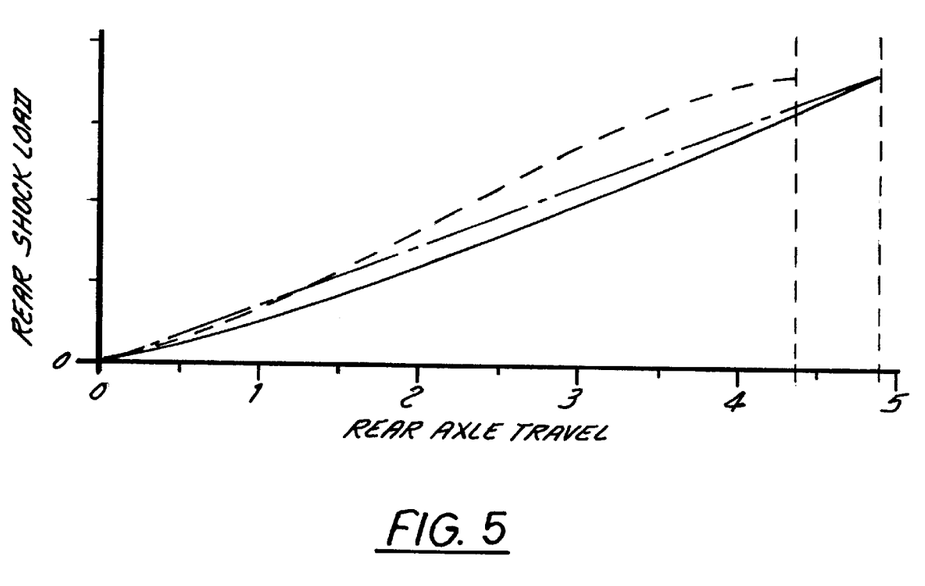
FIG. 5 is a graphic representation of the rear axle travel versus the rear shock load.

FIG. 5 illustrates the performance advantage of the present invention over prior art systems with a graphic representation of the rear axle travel versus the rear shock load. The middle line represents a theoretical linear relationship. The bottom solid line represents a prior art rear suspension where the shock absorber is attached directly to the swing arm. On the prior art suspension, the amount of rear axle travel is almost directly proportional to the rear shock load. In contrast, the present invention, which is represented by the upper dashed line, utilizes a longer stroke length of the shock absorber, which translates into a higher rear shock load for a given amount of rear axle travel.

The "stiffness" of the rear suspension system disclosed herein may be modified to some degree by changing the location of the point where the second end of the shock absorber 16 is attached to the long link 36. Referring for instance to FIG. 2, there are three bolt holes along the vertical length of the intermediate portion of the long link for attaching the shock absorber. For races in which the rider desires a stiffer ride, the uppermost attachment point is used. The lower settings are used when a plusher ride is desired.

Finally, the present invention has been described and illustrated with reference to a particular preferred embodiment, which naturally includes many details about the frame, the rear suspension components, pivot points and so forth. Of course, specific details of the preferred embodiment as described herein are not to be interpreted as limiting the scope of the invention, but are provided merely as a basis for the claims and for teaching one skilled in the art to variously practice and construct the present invention in any appropriate manner. Changes may be made in the details of the construction of various components of the bicycle, without departing from the spirit of the invention especially as defined in the following claims.

What is claimed is:

1. A rear suspension bicycle comprising:
   a frame, said frame comprising a head tube at an upper forward portion of the frame, said head tube supporting a handlebar and a steering fork with a front wheel thereon, a seat tube at an upper rearward portion of the frame for supporting a seat, and a bottom bracket at a lower portion of the frame for supporting a chain drive mechanism,
   said bicycle further comprising a rear suspension system for a rear wheel, said rear suspension system comprising:
   a swing arm pivotally connected to the frame at a first pivot point, said first pivot point being located forwardly and above the bottom bracket, said swing arm extending rearwardly from said first pivot point to a rear axle for the rear wheel;
   a first link pivotally connected to the frame at a second pivot point, said second pivot point being located above and forward of the first pivot point, said first link extending upwardly and rearwardly from the second pivot point;
   a second link pivotally connected to an upper portion of the first link and to the swing arm; and,
   a shock absorber, said shock absorber having a first end pivotally connected to the frame and a second end pivotally connected to an intermediate portion of the first link.

2. The rear suspension bicycle of claim 1, wherein the seat tube and bottom bracket are structurally supported relative to each other so that there is a vertical space between the seat tube and the bottom bracket.

3. The rear suspension bicycle of claim 2, wherein the frame further comprises:
   a down tube extending downwardly and rearwardly from the head tube to the bottom bracket; and,
   a crossbar intersecting the down tube, said crossbar extending rearwardly from the down tube to the seat tube;
   the first end of the shock absorber being pivotally connected to the frame at a point where the crossbar intersects the down tube.

4. The rear suspension bicycle of claim 2, wherein the frame is further comprised of:
   a head arm, said head arm extending forwardly to the head tube;

a seat arm, said seat arm extending rearwardly to the seat tube; and a down arm, said down arm diverging downwardly from the seat arm to the bottom bracket;

the first end of the shock absorber being pivotally connected to the frame at a point substantially where the down arm diverges from the seat arm.

5. The rear suspension bicycle of claim 2, wherein the shock absorber is oriented lengthwise in substantial alignment with a line extending from the point where the first end of the shock absorber is pivotally connected to the frame to the rear axle.

6. The rear suspension bicycle of claim 1, wherein the swing arm is comprised of a forward portion and a rearward portion, said forward portion extending from the first pivot point on the frame upwardly and rearwardly, and said rearward portion extending rearwardly from an upper portion of the forward portion to the rear axle, said forward and rearward portions of said swing arm thereby providing a space between the first pivot point and the rear axle for the chain drive mechanism.

7. The rear suspension bicycle of claim 6, wherein the forward portion of the swing arm extends upwardly and rearwardly from the first pivot point on the frame in a direction that is substantially parallel to the direction that the first link extends upwardly and rearwardly from the second pivot point on the frame.

8. The rear suspension bicycle of claim 7, wherein the intermediate portion of the first link includes a plurality of attachment points for the shock absorber.

9. The rear suspension bicycle of claim 8, wherein the plurality of attachment points are comprised of first, second and third bolt holes along the vertical length of the intermediate portion of the first link for attaching the shock absorber thereto.

10. A rear suspension bicycle comprising:

a frame, said frame including a head tube for supporting a handlebar and a steering fork having a front wheel thereon, a seat tube for supporting a seat, and a bottom bracket for supporting a chain drive mechanism; and, a rear suspension for supporting a rear wheel for up and down movement relative to said frame, said rear suspension comprising:

a first pivot point located on said frame above and forward of said bottom bracket;

a second pivot point located on said frame above and forward of said first pivot point;

a swing arm attached for pivotal movement about said first pivot point, said swing arm extending rearwardly from the first pivot point to a rear axle for the rear wheel;

a first link attached for pivotal movement about said second pivot point;

a second link, said second link being pivotally connected at a third pivot point to the swing arm and said second link also being pivotally connected at a fourth pivot point to the first link;

a shock absorber, said shock absorber being pivotally connected at a fifth pivot point to the frame and said shock absorber also being pivotally connected at a sixth pivot point to the first link;

said first link being pivotable forwardly in response to an upward pivotal movement of the swing arm, said forward pivotal movement of the first link thereby compressing the shock absorber.

11. The rear suspension bicycle of claim 10, wherein the seat tube and bottom bracket are structurally supported relative to each other so that there is a vertical space between the seat tube and the bottom bracket.

12. The rear suspension bicycle of claim 11, wherein the frame further comprises:

a down tube extending downwardly and rearwardly from the head tube to the bottom bracket; and, a crossbar extending rearwardly from the down tube to the seat tube, said crossbar being joined at an intersection to said down tube;

the first end of the shock absorber being pivotally connected to the frame at said intersection.

13. The rear suspension bicycle of claim 11, wherein the frame is further comprised of:

a head arm, said head arm extending forwardly to the head tube;

a seat arm, said seat arm extending rearwardly to the seat tube; and a down arm, said down arm diverging downwardly from the seat arm to the bottom bracket;

the first end of the shock absorber being pivotally connected to the frame at a point substantially where the down arm diverges from the seat arm.

14. The rear suspension bicycle of claim 11, wherein the shock absorber is oriented lengthwise in substantial alignment with a line extending from the point where the first end of the shock absorber is pivotally connected to the frame to the rear axle.

15. The rear suspension bicycle of claim 10, wherein the swing arm is comprised of a forward portion and a rearward portion, said forward portion extending from the first pivot point on the frame upwardly and rearwardly, and said rearward portion extending rearwardly from an upper portion of the forward portion to the rear axle, said forward and rearward portions of said swing arm thereby providing a space between the fist pivot point and the rear axle for the chain drive mechanism.

16. The rear suspension bicycle of claim 15, wherein the forward portion of the swing arm extends upwardly and rearwardly from the first pivot point on the frame in a direction that is substantially parallel to the direction that the first link extends upwardly and rearwardly from the second pivot point on the frame.

17. The rear suspension bicycle of claim 16, wherein the intermediate portion of the first link includes a plurality of attachment points for the shock absorber.

18. The rear suspension bicycle of claim 17, wherein the plurality of attachment points are comprised of first, second and third bolt holes along the vertical length of the intermediate portion of the first link for attaching the shock absorber thereto.

19. A bicycle rear suspension system for supporting a rear wheel for up and down movement relative to a bicycle frame, said bicycle rear suspension system comprising:

a swing arm attached for pivotal movement relative to the frame about a first pivot point, said swing arm extending rearwardly from said first pivot point to a rear axle for the rear wheel;

a first link attached for pivotal movement relative to the frame about a second pivot point, a second link pivotally connected to both the swing arm and to the first link;

a shock absorber pivotally connected to the frame and also pivotally connected to a third pivot point on the first link;

the distance between the first pivot point and the rear axle defining a distance D; and, the distance between the first pivot point and the third pivot point defining a distance d;

said first link being pivotable toward said frame in response to an upward movement of the swing arm to thereby compress said shock absorber;

whereby, upon said upward movement of the rear wheel, the ratio $$\left(\frac{D}{d}\right)$$

decreases.

20. The bicycle rear suspension system of claim 19, wherein the frame comprises a head tube at an upper front portion of the frame, said head tube supporting a handlebar and a steering fork for a front wheel, a seat tube at an upper rearward portion of the frame for supporting a seat, and a bottom bracket for supporting a chain drive mechanism.

21. The bicycle rear suspension system of claim 20, wherein the seat tube and bottom bracket are structurally supported relative to each other by the frame so that there is a vertical space between the seat tube and bottom bracket.

22. The bicycle rear suspension of claim 21, wherein:

the first pivot point is located immediately above and forward of the bottom bracket; and the second pivot point is located immediately above and forward of the first pivot point.

23. The bicycle rear suspension system of claim 22, wherein:

said swing arm is comprised of a forward portion and a rearward portion; said forward portion extending upwardly and rearwardly from the first pivot point on the frame, and said rearward portion extending rearwardly from an upper portion of the forward portion to the rear axle;

said first link extending upwardly and rearwardly from the second pivot point, said first link being substantially parallel to the forward portion of the swing arm.

24. The bicycle rear suspension system of claim 23, further including a plurality of attachment points along a vertical length of an intermediate portion of the first link for attaching the shock absorber to the first link.

25. The bicycle rear suspension system of claim 23, wherein said second link is pivotally connected to an upper portion of the forward portion of the swing arm, and said second link is pivotally connected to an upper portion of the first link.

26. The bicycle rear suspension system of claim 25, wherein the forward portion of the swing arm, the first and second link and the shock absorber are located within the vertical space between the seat tube and bottom bracket.

27. A rear suspension bicycle comprising:

a frame, said frame including a head tube at an upper front portion of the frame, said head tube supporting a handlebar and a steering fork supporting a front wheel, a seat tube at an upper rearward portion of the frame supporting a seat, and a bottom bracket supporting a chain drive mechanism;

a swing arm attached for pivotal movement relative to the frame about a first pivot point located above and forward of the bottom bracket, said swing arm extending rearwardly from said first pivot point to a rear axle, said rear axle supporting a rear wheel;

a first link attached for pivotal movement relative to the frame about a second pivot point located above and forward of the first pivot point;

a second link pivotally connected to both the swing arm and to the first link;

a shock absorber pivotally connected to the frame and also pivotally connected to a third pivot point on the first link;

the distance between the first pivot point and the rear axle defining a distance D; and, the distance between the first pivot point and the third pivot point defining a distance d;

said first link being pivotable toward said frame in response to an upward movement of the swing arm to thereby compress said shock absorber;

whereby, upon an upward movement of the rear wheel, the ratio $$\left(\frac{D}{d}\right)$$

decreases.

28. The rear suspension bicycle of claim 27, wherein the seat tube and bottom bracket are structurally supported relative to each other by the frame so that there is a vertical space between the seat tube and bottom bracket.

29. The rear suspension bicycle of claim 28, wherein:

said swing arm is comprised of a forward portion and a rearward portion; said forward portion extending upwardly and rearwardly from the first pivot point on the frame, and said rearward portion extending rearwardly from an upper portion of the forward portion to the rear axle;

said first link extending upwardly and rearwardly from the second pivot point, said first link being substantially parallel to the forward portion of the swing arm.

30. The rear suspension bicycle of claim 27, further including a plurality of attachment points along a vertical length of an intermediate portion of the first link for attaching the shock absorber to the first link.

31. The rear suspension bicycle of claim 30, wherein said second link is pivotally connected to an upper portion of the forward portion of the swing arm, and said second link is pivotally connected to an upper portion of the first link.

32. The rear suspension bicycle of claim 29, wherein the forward portion of the swing arm, the first and second link and the shock absorber are located within the vertical space between the seat tube and bottom bracket.

* * * * *